United States Patent
Garg et al.

(10) Patent No.: US 9,363,467 B2
(45) Date of Patent: Jun. 7, 2016

(54) ENVIRONMENTAL SIGNATURES FOR FORENSIC ANALYSIS AND ALIGNMENT OF MEDIA RECORDINGS

(71) Applicant: University of Maryland, Office of Technology Commercialization, College Park, MD (US)

(72) Inventors: Ravi Garg, College Park, MD (US); Avinash L. Varna, Chandler, AZ (US); Adi Hajj-Ahmad, College Park, MD (US); Min Wu, Clarksville, MD (US)

(73) Assignee: University of Maryland, College Park, College Park, MD (US)

( * ) Notice: Subject to any disclaimer, the term of this patent is extended or adjusted under 35 U.S.C. 154(b) by 8 days.

(21) Appl. No.: 14/093,399

(22) Filed: Nov. 29, 2013

(65) Prior Publication Data

US 2014/0147097 A1    May 29, 2014

Related U.S. Application Data

(60) Provisional application No. 61/731,353, filed on Nov. 29, 2012.

(51) Int. Cl.
*H04N 5/913* (2006.01)

(52) U.S. Cl.
CPC ...... *H04N 5/913* (2013.01); *H04N 2005/91342* (2013.01)

(58) Field of Classification Search
CPC ............ H04N 5/913; H04N 2201/323; H04N 2005/91342; H04N 21/2347; H04N 21/4405; H04N 21/4408; H04N 5/04; G11B 20/10527
USPC ............................... 380/201; 726/26; 713/193
See application file for complete search history.

(56) References Cited

PUBLICATIONS

Gerazov et al., "Tracking of Electrical Network Frequency for the Purpose of Forensic Audio Authentication", 2012, IEEE, pp. 1164-1169.*
Liu et al., "Wide-area Frequency as a Criterion for Digital Audio Recording Authentication", 2011, IEEE, pp. 1-7.*
Garg et al., ""Seeing" ENF: Natural Time Stamp for Digital Video via Optical Sensing and Signal Processing", 2011, IEEE, pp. 23-32.*
Ahmad et al., "Instantaneous Frequency Estimation and Localization for ENF Signals", 2012, IEEE, pp. 1- 10.*
Ojowu et al., "ENF Extraction From Digital Recordings Using Adaptive Techniques and Frequency Tracking", Jul. 9, 2012.*

* cited by examiner

*Primary Examiner* — Matthew Smithers
(74) *Attorney, Agent, or Firm* — Squire Patton Boggs (US) LLP (57) ABSTRACT

Various systems and methods may benefit from determination of environmental signatures in recordings. For example, such signatures may aid forensic analysis and alignment of media recordings, such as alignment of audio or video recordings. A method can include reading data representative of sensed light in a visual track of a video recording. The method can also include extracting an electric network frequency signal from the data representative of sensed light.

18 Claims, 5 Drawing Sheets

ENVIRONMENTAL SIGNATURES FOR FORENSIC ANALYSIS AND ALIGNMENT OF MEDIA RECORDINGS

CROSS REFERENCE TO RELATED APPLICATIONS

This application is related to and claims the benefit and priority of U.S. Provisional Patent Application No. 61/731,353 filed Nov. 29, 2012, which is hereby incorporated herein by reference in its entirety including the references cited therein.

GOVERNMENT LICENSE RIGHTS

This invention was made with government support under FA95501010140 awarded by AFOSR and ECCS0824081 awarded by NSF. The government has certain rights in the invention.

BACKGROUND

1. Field

Various systems and methods may benefit from determination of environmental signatures in recordings. For example, such signatures may aid forensic analysis and alignment of media recordings, such as alignment of audio or video recordings.

2. Description of the Related Art

Advancement in multimedia technologies has given rise to proliferation of such media recording devices as voice recorders, camcorders, digital cameras, and the like. A huge amount of digital information created using such devices can be stored on disks or uploaded on such social media platforms. Metadata describing such important information as the time and the place of recording may be manually added or can be embedded to a media recording using built-in clocks and global positioning system (GPS) in the recording devices. However, digital tools can be used to modify the stored information.

Forensic tools can be used to authenticate multimedia recordings using a signature, known as Electrical Network Frequency (ENF) signal, emanated from power networks. ENF is the supply frequency of electric power in power distribution networks, and its nominal value is 50 or 60 Hz depending on the geographic location. A property of the electric network frequency signal is that its value fluctuates around the nominal value: on the order of approximately 50-100 mHz in the United States. These fluctuations are due to variations in the load on the power grid and generally can be considered as random. Such randomly varying electric network frequency signal can be embedded in multimedia recordings due to the electromagnetic interference from nearby power lines in audio, and invisible flickering of electric powered indoor lightings.

Electric network frequency fluctuations based forensic analysis can thus be used for multimedia authentication tasks as time-of-recording estimation, timestamp verification, and clip insertion/deletion forgery detection. Electric network frequency can fluctuate due to dynamic changes in load demand and power supply, and these fluctuations travel over the power lines with a finite speed.

The electric network frequency signal can be extracted from power signals measured from a power outlet using a step-down transformer and a simple voltage divider circuit. The power signal is divided into time-frames, and frequency estimation algorithms are applied on each frame to determine its dominant frequency, thus estimating the instantaneous electric network frequency signal. The importance of the electric network frequency for multimedia forensics emerges because the electric network frequency can also be present in audio or video recordings due to electromagnetic influences in the place of recording. The electric network frequency variations extracted from a clean power signal match with the electric network frequency variations extracted from an audio signal recorded at the same time and in the same power grid as the power signal.

SUMMARY

According to certain embodiments, a method can include reading data representative of sensed light in a visual track of a video recording. The method can also include extracting an electric network frequency signal from the data representative of sensed light.

In certain embodiments, a method can include reading an electric network frequency signal. The method can also include obtaining a location signature for the electric network frequency signal. The location signature can be on a smaller scale than a grid.

A method can, in certain embodiments, include reading an electric network frequency signal from a recording. The method can also include determining a plurality of statistical characteristics of the electric network frequency signal. The method can additionally include determining a location of the recording based on the plurality of statistical characteristics.

An apparatus, according to certain embodiments, include at least one processor and at least one memory including computer program code. The at least one memory and the computer program code can be configured to, with the at least one processor, cause the apparatus at least to read data representative of sensed light in a visual track of a video recording. The at least one memory and the computer program code can also be configured to, with the at least one processor, cause the apparatus at least to extract an electric network frequency signal from the data representative of sensed light.

In certain embodiments, an apparatus can include at least one processor and at least one memory including computer program code. The at least one memory and the computer program code can be configured to, with the at least one processor, cause the apparatus at least to read an electric network frequency signal. The at least one memory and the computer program code can also be configured to, with the at least one processor, cause the apparatus at least to obtain a location signature for the electric network frequency signal. The location signature can be on a smaller scale than a grid.

According to certain embodiments, an apparatus can include at least one processor and at least one memory including computer program code. The at least one memory and the computer program code can be configured to, with the at least one processor, cause the apparatus at least to read an electric network frequency signal from a recording. The at least one memory and the computer program code can also be configured to, with the at least one processor, cause the apparatus at least to determine a plurality of statistical characteristics of the electric network frequency signal. The at least one memory and the computer program code can further be configured to, with the at least one processor, cause the apparatus at least to determine a location of the recording based on the plurality of statistical characteristics.

An apparatus, in certain embodiments, can include means for reading data representative of sensed light in a visual track of a video recording. The apparatus can also include means for extracting an electric network frequency signal from the data representative of sensed light.

An apparatus, according to certain embodiments, can include means for reading an electric network frequency signal. The apparatus can also include means for obtaining a location signature for the electric network frequency signal. The location signature can be on a smaller scale than a grid.

According to certain embodiments, an apparatus can include means for reading an electric network frequency signal from a recording. The apparatus can also include means for determining a plurality of statistical characteristics of the electric network frequency signal. The apparatus can further include means for determining a location of the recording based on the plurality of statistical characteristics.

A non-transitory computer-readable medium can, in certain embodiments, be encoded with instructions that, when executed in hardware, perform a process. The process can include reading data representative of sensed light in a visual track of a video recording. The process can also include extracting an electric network frequency signal from the data representative of sensed light.

A non-transitory computer-readable medium can, according to certain embodiments, be encoded with instructions that, when executed in hardware, perform a process. The process can include reading an electric network frequency signal. The process can also include obtaining a location signature for the electric network frequency signal. The location signature can be on a smaller scale than a grid.

According to certain embodiments, a non-transitory computer-readable medium can be encoded with instructions that, when executed in hardware, perform a process. The process can include reading an electric network frequency signal from a recording. The process can also include determining a plurality of statistical characteristics of the electric network frequency signal. The process can further include determining a location of the recording based on the plurality of statistical characteristics.

BRIEF DESCRIPTION OF THE DRAWINGS

For proper understanding of the invention, reference should be made to the accompanying drawings, wherein.

DETAILED DESCRIPTION

Instantaneous electric network frequency can be estimated using Fourier transform based frequency estimation methods. For timestamp authentication and verification, similarity between the electric network frequency signals extracted from multimedia and the electric network frequency signal from power database at corresponding time can be measured by means of Normalized Cross-Correlation (NCC) coefficient. A high value of NCC can indicate the time at which recording took place. If the given multimedia query is of sufficiently long duration (for example, more than 10 minutes), the correlation coefficient metric between the electric network frequency signals can be reliably used to authenticate given multimedia recordings.

High resolution frequency estimation methods such as MUSIC and ESPRIT may provide better instantaneous frequency estimation of the electric network frequency signal for short segments and in the presence of higher noise level, as compared with the Fourier transform based methods. The performance of electric network frequency matching can further be improved by considering an autoregressive model of the signal. Based on this model, matching two electric network frequency signals by estimating the correlation coefficient between the corresponding innovations sequences may provide a better confidence in time-of-recording estimation and verification.

One use of the electric network frequency signal is as a timestamp for multimedia recordings. Additionally, the electric network frequency signal can be used to estimate or verify the place of recording of an audio or a video.

At an inter-grid level, it may be possible to differentiate between the recordings conducted across different grids, as the fluctuations in the electric network frequency signal may be different across different grids at the same time. At an intra-grid level, conventional approaches assumed that the electric network frequency signals across an interconnected power grid are similar at a given time period. However, variations may still be present in the frequency fluctuations at different locations due to the local changes in the load and the finite propagation speed of the effects of this load change to other parts of the grid.

Indeed, there exist differences among electric network frequency signals extracted from recordings taken in different locations within the same interconnected power grid. Localization protocols can then therefore be applied to estimate location of the recordings. The challenges arising due to the noisy nature of the electric network frequency signal from multimedia recordings can be variously addressed.

The fluctuations in the electric network frequency signal in the same grid may be due to the dynamic nature of the load on the grid. Power demand and supply in a given area can follow a cyclic pattern. For example, demand typically increases during evening hours in a residential neighborhood, as people switch on air-conditioning and other power units. For robust operation of the grid, any change in the load in a grid is regulated by a control mechanism. An increase in the load can cause the supply frequency to drop temporarily. The control mechanism can sense the frequency drop and can start drawing power from adjoining areas to compensate for the increased demand. As a result, the load in adjoining areas can also increase, which can lead to a drop in the instantaneous supply frequency. The overall power supply can be driven up to compensate for the rising load, which in turn leads to a drop in the instantaneous supply frequency in those regions. A similar mechanism can be used to compensate for an excess supply of power flow that leads to a surge in supply frequency.

A small change in the load in a given area may have a localized effect on electric network frequency in that area. However, a large change, such as one caused by a generator failure, may have an effect on the whole grid. In the eastern grid of US, these changes may propagate along the grid at a typical speed of approximately 500 miles per second.

Small and large changes in the load may cause location specific signatures in the electric network frequency patterns, and such differences may be exploited to narrow down the location of a recording within a power grid. Due to a finite speed of propagation of frequency disturbances across the grid, the electric network frequency signal may be more similar for locations close to each other as compared with the locations farther apart. Such a property of the electric network frequency signal propagation across the grid can be used for localization at a finer resolution within a grid by comparing the similarity of the electric network frequency signal in question with the electric network frequency databases that may be available for a set of locations.

Various embodiments may utilize these principles. For example, certain embodiments can estimate a high temporal-frequency resolution Electrical Network Frequency (ENF) signal from a given recording. This technique can be based on merging the harmonics of nominal value of electric network frequency to obtain a more robust estimate of the signal. Moreover certain embodiments can provide improved ENF matching by using a decorrelated electric network frequency signal for computing the correlation coefficient between the reference and the query EFN signal. Furthermore, a technology based on Electrical Network Frequency Signal can be used to estimate the location of recordings. Certain embodiments can be based on extracting a location specific signature signal from the electric network frequency signals. Moreover, certain embodiments can be used to estimate the location of multimedia recordings, such as audio and video recordings.

Figure 1:
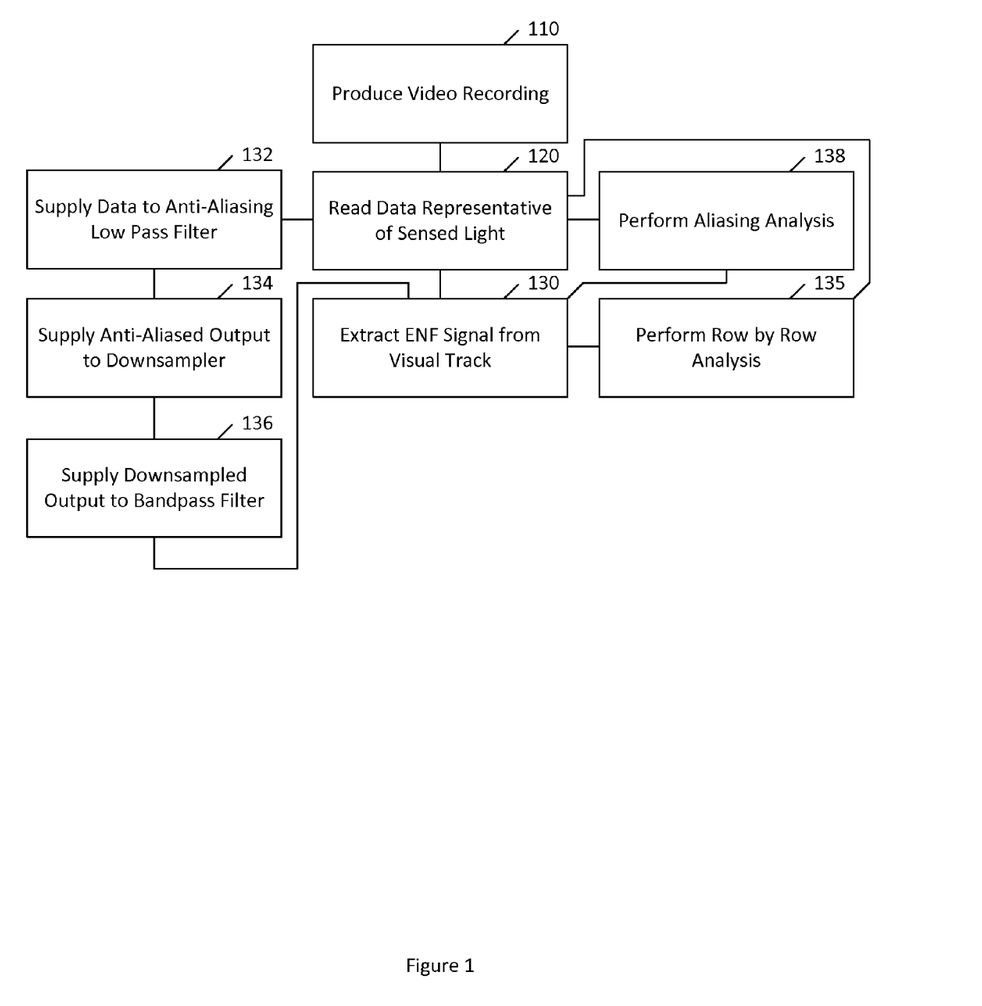
FIG. 1 illustrates a method according to certain embodiments.

FIG. 1 illustrates a method according to certain embodiments. As shown in FIG. 1, a method can include, at 110, producing a video recording. Producing the video recording can include using light sensing circuitry to record incident light. The method can also include, at 120, reading data representative of sensed light in a visual track of a video recording. Video recordings in accordance with certain embodiments can have only visual track(s) or visual track(s) and audio track(s), as well as other metadata. Nevertheless, for certain aspects of certain embodiments each visual track may be separately considered from other tracks or metadata.

The method can also include, at 130, extracting an electric network frequency signal from the data representative of sensed light. There are a variety of ways that this extraction can be performed.

For example, to extract the electric network frequency signal, the recorded signals can be given as an input to an anti-aliasing low-pass filter with passband of 125 Hz. The resulting signal can be down sampled by a factor of 4 to reduce the sampling rate from an original sampling rate of 1 KHz to 250 Hz, and then passed through an equiripple band-pass filter with a narrow passband centered at 120 Hz.

After applying preprocessing to recorded signals using the method described above, the dominant instantaneous frequencies in each signal can be estimated in order to, for example, measure the fluctuations in electric network frequency signal as a function of time. For this purpose or other purposes, different types of frequency estimators based on parametric and nonparametric spectrum estimation techniques can be used. One example of a nonparametric method is a zero-crossing method.

In the zero-crossing method, a recorded signal can be divided into overlapping frames of $T_{frame}$ seconds each, with an overlap factor of 50%, and the number of times signal crosses zero in each frame can be counted. The dominant instantaneous frequency in each frame can be recorded as half of the zero-crossing count.

Spectrogram methods are also nonparametric methods. A spectrogram can calculate and display a short time Fourier transform (STFT) of the signal. To obtain the spectrogram of the electric network frequency signal, the signal can be divided into overlapping frames of $T_{frame}$ seconds each, with an overlap factor of 50%. A high resolution 8192 points FFT can be taken for each frame, providing a frequency resolution of approximately 0.03 Hz for a preprocessed signal at 250 Hz sampling rate.

After obtaining the spectrogram of the electric network frequency signal, the following frequency domain techniques can be used to estimate the dominant instantaneous frequencies in the electric network frequency signal. First, in a maximum energy method the frequency corresponding to the maximum energy in each time bin of the spectrogram can be identified. The resulting one-dimensional signal can represent the instantaneous frequencies as a function of time. Next, in a weighted energy method, the weighted average frequency can be recorded in each time bin of the spectrogram. The average frequency can be obtained by weighing frequency bins around a nominal electric network frequency value with the corresponding energy present. For example:

$$F(n) = \frac{\sum_{l=L_1}^{L_2} f(n,l)|S(n,l)|}{\sum_{l=L_1}^{L_2} |S(n,l)|}$$

where $L_1 = \lfloor (f_{ENF} - 0.5) N_F/f_s \rfloor$ and $L_2 = \lceil (f_{ENF} + 0.5) N_F/f_s \rceil$; where $f_s$ and $N_f$ are the sampling frequency and the number of FFT points used to compute the spectrogram; $f(n,l)$ and $S(n,l)$ are the frequency and the energy in the frequency bin of the time-frame of the recorded signal's spectrogram, respectively. To estimate the dominant instantaneous frequency around a known frequency value, namely a nominal electric network frequency value, the value of l can be chosen to include the band within ±0.5 Hz of the electric network frequency of interest.

Parametric methods can also be used. Subspace methods are a class of parametric spectrum estimation techniques for frequency estimation of a sinusoidal signal submerged in additive noise. These methods can be used in applications where the length of a given signal is small, and the separation between the frequencies to be retrieved may be shorter than the Fourier resolution limit. Electric network frequency signals in multimedia recordings can be quite noisy and the dynamic range of the frequency variations may be small. Subspace methods may assist in obtaining accurate estimation of electric network frequency signals and increasing the temporal resolution of electric network frequency matching in such scenarios.

Two such parametric methods include the multiple signal component (MUSIC) approach and the Estimation of Parameters using Rotational Invariant Techniques (ESPRIT) method. Variations on these methods, such as the Root MUSIC method can also be used, as explained in Garg et al. "'Seeing' ENF: Power-Signature-Based Timestamp for Digital Multimedia," IEEE Transactions on Information Forensics and Security, Volume 8, Number 9, September 2013, see also Garg et al. "'Seeing' ENF: Natural Time Stamp for Digital Video via Optical Sensing and Signal Processing," MM '11, Dec. 1, 2011, each of which is hereby incorporated herein by reference in its entirety together with the reference cited therein.

Thus, for example, at 132, the extracting can include supplying the data representative of sensed light to an anti-aliasing low pass filter. Moreover, at 134, the extracting can include supplying an output of the low pass filter to a down sampler. Then, at 136, the extracting can additionally include supplying an output of the down sampler to an equiripple band-pass filter with a narrow passband. More generally, the extracting can include, at 138, performing an aliasing analysis.

For example, electric network frequency signals recorded by video cameras under electric powered indoor lighting may experience significant aliasing due to the lower temporal sampling rate of cameras compared to the 100 Hz/120 Hz frequency components present in the light flickering. Electric network frequency signals in videos may appear at different predetermined frequencies, which can be analyzed from a sampling theorem.

As an example, the effect of a video recording in indoor lighting powered by a 50-Hz source can be considered. Since the current changes polarity at twice the power mains frequency, the light in this case flickers at 100 Hz. Additionally, when the power mains signal slightly deviates from a perfect sinusoid form, higher harmonics of decaying energy can be present at integer multiples of 100 Hz. The bandwidth of these higher harmonics can also be greater than the main component because the practical electric network frequency signal of interest may be a narrowband signal and not a perfectly stable sinusoid.

Thus, the bandwidth of the $k^{th}$-harmonic component can be k-times the bandwidth of the main electric network frequency component at 100 Hz. In addition, in practical visual recordings, there may be little or no anti-aliasing lowpass filtering along temporal axis during the initial analog-to-digital acquisition.

The camera used for capturing video may be, for example, an NTSC standard camera with a frame-rate of 29.97 Hz. Because of the low temporal sampling rate as compared to the required Nyquist sampling rate to avoid aliasing, the resulting spectra may have periodic tiling of frequency components at $\pm 100 + 29.97$ k, k=0, ±1, ±2, ....

Because of the periodic nature of the resulting spectra, it may suffice to focus on replicas within one period. The multiple copies of the electric network frequency related components can appear in the temporal spectrum of the video signal around different but predetermined frequencies. These multiple copies can arise due to the presence of higher harmonics in the power mains signal, and may be combined strategically to obtain a better estimate of the video electric network frequency signal.

Because the magnitude spectrum of a real valued signal is symmetric about the y-axis, the original spectrum of the electric network frequency signal in indoor lighting can also have symmetric components at −100 Hz and its harmonics. After sampling by a video camera, a frequency component that is at −200 Hz in the spectrum of the original signal, can appear at 9.79 Hz in the recorded signal. Similarly, the component that was present at 100 Hz in the spectrum of the original signal can now appear at 10.09 Hz. As a result, replicas of the electric network frequency signal can be obtained at 9.79 Hz and 10.09 Hz. These replicas can be mirrored versions of each other with different bandwidths. Similar analysis can be performed on other combinations of different camera frame-rates and power mains frequencies to find the frequencies at which the main component and the second harmonic component of the signal appear.

The method can also or alternatively include performing row by row analysis, at 135. The row by row analysis may be useful in the case of CMOS imaging sensors. CMOS imaging sensors are increasingly used in a wide variety of imaging systems of still images and videos, such as mobile phone cameras, web cameras, and standalone digital cameras. Many consumer-end cameras equipped with CMOS sensors contain column-parallel readout circuits. These circuits read all the pixels in a row at the same time. The readout proceeds from a row to another in a sequential manner from top to bottom, with no overlap in the readout time of different rows. Such a sampling mechanism by the imaging sensors is referred to as a rolling shutter mechanism.

In a rolling shutter approach, each row of the image is exposed to the light at a different time, which can create artifacts for fast moving objects in the scene. However, as each frame of a video captured using rolling shutter cameras has undergone space-time sampling, this mechanism can be exploited for high speed photography and optical flow based applications, kinematics, and object pose estimation. The spatial-temporal sampling nature of the rolling shutter can provide a potentially high sampling rate of the electric network frequency signal as compared to the traditional CCD-based cameras.

The electric network frequency signal captured in recordings using CCD camera with 29.97 fps and 30 fps in the 60 Hz power frequency region may be expected to appear at 0.12 Hz and DC frequency, respectively. The electric network frequency signal at these aliased frequencies can be obscured by the content frequency of the video recordings. By exploiting high temporal sampling on a line by line basis from CMOS camera recordings, aliasing can be mitigated on the frame level.

To extract electric network frequency signals from videos recorded using CMOS cameras, the spatial average of each row can be used as a sample. The resulting signal can be passed through a bandpass filter in the electric network frequency band of interest. The bandpassed signal can be downsampled to 1000 Hz sampling frequency, and resultant signal can be used for frequency estimation using, for example, the methods described elsewhere herein.

The method can further include, at 140, determining a location of the sensed light based on the extracted electric network frequency signal. Alternatively, or in addition, the method can include, at 145, determining whether tampering of the video recording has occurred by comparing the electric network frequency signal to another sample of electric network frequency signal. For example, the other sample can be either an adjacent or nearby sample in a visual track or a sample from an allegedly corresponding time in an audio track.

Trying to correlate the electric network frequency signal to another electric network frequency signal may pose a variety of challenges. For example, a Normalized Cross-Correlation (NCC) function between two electric network frequency signals may have multiple local maximum peaks. Such local maxima may arise from the correlated structure of the electric network frequency fluctuations. Because of such correlation, the electric network frequency value at time instant n may be highly correlated with the electric network frequency value at another time instant n−k, and may give false alarm in estimation of time-of-recording or other forensics analysis on a given video. This situation can be resolved by, for example, performing a decorrelation of the electric network frequency signal.

An autoregressive (AR) model can be used for electric network frequency signals. Statistically, the electric network frequency signal may be a piecewise stationary signal. According to the Wold decomposition theorem in statistical signal processing, a stationary signal can be decomposed into an innovation process and a predictable process, and these two processes are uncorrelated with each other, according to the theorem. So, the zero-mean shifted electric network frequency signal, F(n), at time n, can be modeled as a linear combination of its past samples and a white noise process, v(n):

$$F(n) = \sum_{k=1}^{L} a_k(n)F(n-k) + v(n)$$

where $a_1(n)$, $a_1(n)$, ..., $a_L(n)$ represent the weighing coefficients.

Here, v(n) represents a signal that is independent of its past samples and brings innovations to the electric network frequency signal F(n).

The parameters $a_1(n)$, $a_1(n)$, ..., $a_L(n)$ can be estimated using the Yule-Walker equations. Then the definition of F(n) can be applied to estimate the process v(n). Finally, the innovation process can be used to perform correlation-based matching analysis.

Figure 2:
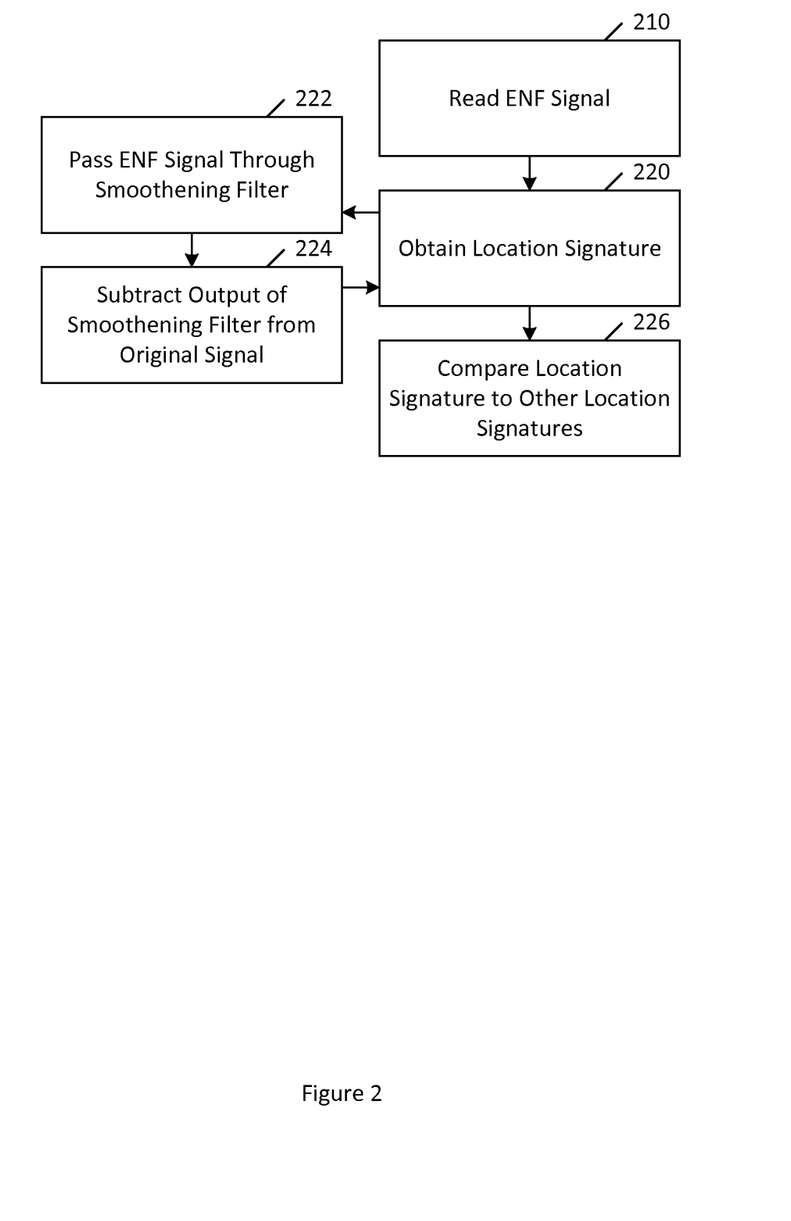
FIG. 2 illustrates another method according to certain embodiments.

FIG. 2 illustrates another method according to certain embodiments. As shown in FIG. 2, a method can include, at 210, reading an electric network frequency signal. The method can also include, at 220, obtaining a location signature for the electric network frequency signal. The location signature can be on a smaller scale than a grid. For example, the scale can be the scale of a metropolitan area, county, or the like. In a particular example, the scale may be on the order of 10% or less of the grid. In other words, the location signature can identify the location to a degree of accuracy that is significantly more precise than simply the grid. For example, the location signature may be able to distinguish a location signature corresponding to the Philadelphia area from a location signature corresponding to the New York City area, and each of those from a College Park, Maryland area.

The obtaining the location signature can include, at 222, passing the electric network frequency signal through a smoothening filter, which can be one filter or a combination of filters. The obtaining the location signature can also include, at 224, subtracting an output of the smoothening filter from the electric network frequency signal.

Also, the obtaining the location signature can include, at 226, comparing the location signature to at least one other location signature having a known location within a grid.

Location signatures can be obtained in various ways. For example, as mentioned above, the electric network frequency signal can be represented as f(n). Then, a smoothened version of the signal can be represented as follows:

$$f_{smooth}(n) = \sum_{k=0}^{N-1} w(k)f(n-k)$$

where w(k)=1/N for 0<=k<=N-1. This smoothened version of the signal can be subtracted from the original signal to yield a high pass version of the signal. A correlation coefficient between two high pass versions of recordings can be used as a measure of the distance between their respective locations. An order 3 smoothening filter or an order 7 smoothening filter can be used.

Once distances between known recordings and an unidentified recording are known, the position of the unidentified recording can be estimated using a triangulation or multilateration technique.

An alternative approach may be a half-plane intersection technique. Half-planes can be hyper-planes satisfying distance relationships for a given correlation relation. In two dimensions, half planes can be separated by a straight line. Each additional constraint can provide increasingly fine localization. However, near the half plane boundary, a small error can lead to the wrong half plane being selected. In certain embodiments, this issue can be avoided by refusing to use constraints that are within a predetermined threshold of the half plane boundary.

The constraints for a half plane approach may be recordings in a plurality K of anchor cities. The location of K anchor cities by $P_1=\{x_1, y_1\}$, $P_1=\{x_1, y_1\}$, ..., $P_K=\{X_K, y_K\}$. The electric network frequency data collected at all anchor cities can be provided, along with their known locations. Based on this information, a localization protocol can be used to estimate the unknown location of a city node (denote by A) that lies in a set of locations described by convex hull of $P_1$, $P_2$, ... $P_K$ using electric network frequency data collected at city A and all the anchor nodes.

If the distance of $P_i$ from city A is greater than the distance of $P_j$ from city A, then generally $p_{j,A}>p_{i,A}$ holds true. Thus, it can be concluded that the location of city A lies in the half plane described by the set of points $\overline{P_{i,j}}$ given by the following equation:

$$\overline{P_{i,j}} = \begin{cases} \{X : \|X - P_i\|_2 > \|X - P_j\|_2, X \in D\} & \text{if } p_{j,A} > p_{i,A} \\ \{X : \|X - P_j\|_2 > \|X - P_i\|_2, X \in D\} & \text{if } p_{i,A} > p_{j,A} \end{cases}$$

where D is the domain of the solution. Using the correlation value obtained from all the anchor nodes, the set of feasible points can be further reduced by computing the intersection of all the feasible halfplanes as follows:

$$\overline{P_A} = \cap_{i,j} \overline{P_{i,j}} \; i,j \in \{1,2,\ldots,K\}, i \neq j$$

The conditions on the correlation coefficient can be hard decision rules, and may not take into account the noisy nature of correlation coefficients estimated between two cities electric network frequency data. For example, when the value of correlation coefficients for $i^{th}$ and $j^{th}$ location are very close to each other such that the absolute value of the difference between $p_{j,A}$ and $p_{i,A}$ is less than $\epsilon$ for a very small value of $\epsilon$, then the confidence in assigning a region to the feasible solution set $\overline{P_{i,j}}$ may be reduced.

To compensate for such values of correlation coefficients, the feasible set $\overline{P_{i,j}}$ can be replaced with the following equation:

$$\overline{P_{i,j}} = \begin{cases} \{X : \|X - P_i\|_2 ? \|X - P_j\|_2, X \in D\} & \text{if } p_{j,A} > p_{i,A} + \varepsilon \\ \{X : \|X - P_j\|_2 > \|X - P_i\|_2, X \in D\} & \text{if } p_{i,A} > p_{j,A} + \varepsilon \end{cases}$$

In this way, the feasible set can avoid the use of constraints that have more than a slight chance of error due to noise.

Further localization may be achievable, for example, by consideration of various quantitative features of an electric network frequency. For example, various quantitative features can be extracted. For the purposes of the present discussion, a set of electric network frequency signal segments, s[n], of fixed size S from candidate power grids can be considered. These electric network frequency segments can correspond to electric network frequency-containing signals whose size is on the order of minutes.

The mean of an electric network frequency segment is one example of a feature component to include. Another feature is the variance of the segment. Similarly, a further feature can be the dynamic range of the segment, namely the maximum electric network frequency value minus the minimum value. For other features, a transformation can be applied to the electric network frequency segment and the statistical properties of the transformation can be treated as features.

For example, wavelet signal analysis can be used to study signals at multiple time-frequency resolutions. An L-level dyadic wavelet decomposition can be applied, in which each level can provide an approximation to the original signal and the detailed variations at a specific level of resolution. The variances of the high-pass band can be calculated of each decomposition level, which can correspond to the details. The variance of the lowest time-frequency band, the approximation, can also be calculated. These can variances can be candidate features.

Figure 3:
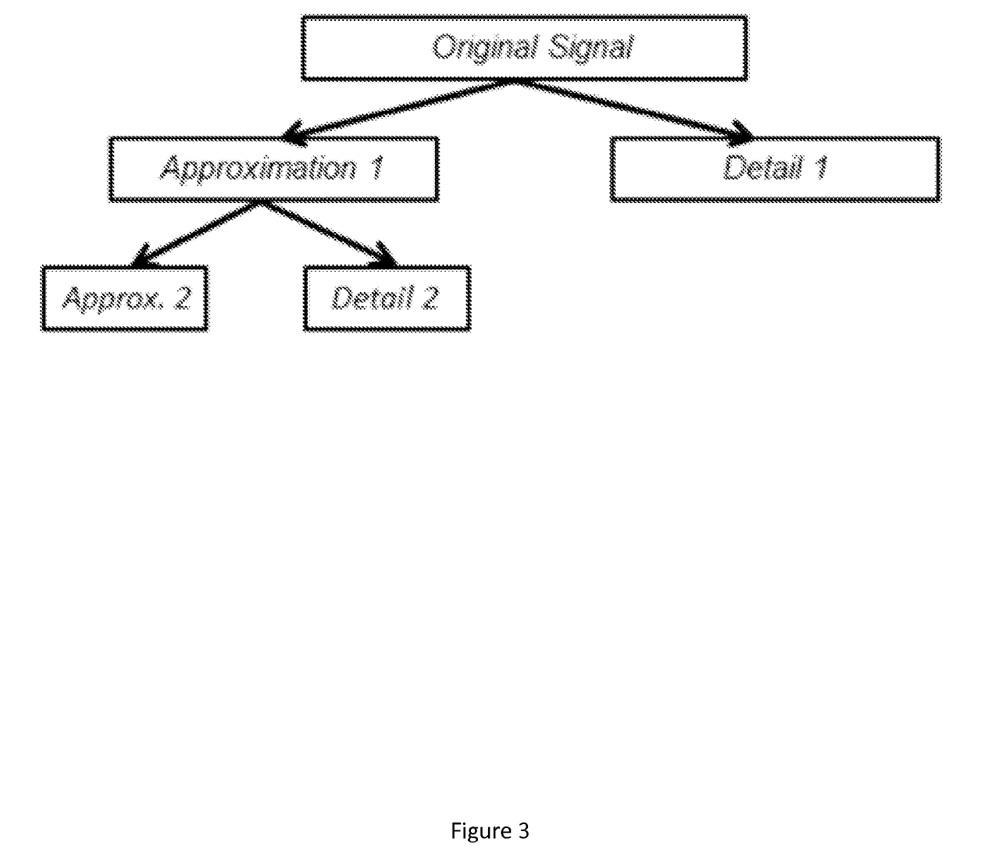
FIG. 3 illustrates a two level wavelet decomposition according to certain embodiments.

FIG. 3 illustrates a two level wavelet decomposition according to certain embodiments. In this case, the signals whose variances are taken as feature components can be Approximation 2 and Details 1 and 2.

Complementing the wavelet features, a set of features obtained from a statistical modeling of the electric network frequency signal can be extracted. An autoregressive (AR) model of order 2 for electric network frequency signals can be used. Thus, for example, an electric network frequency signal s[n] can be modeled as follows:

$$s[n]=a_1s[n-1]+a_2s[n-2]+v[n]$$

Three feature values may, for example, be taken from this AR modeling: the two AR parameters resulting from modeling, $a_1$ and $a_2$, and the variance of the model's innovation signal v[n]. The variance of the innovation signal can be an indicator as to how well the signal can be fitted into the AR(2) model, and the AR parameters can entail the manner of relations between samples of s[n]. For more details and other examples, see Hajj-Ahmad et al. "ENF Based Location Classification of Sensor Recordings," WIFS '2013, Nov. 21, 2013, and Garg et al. "Modeling and Analysis of Electric Network Frequency Signal for Timestamp Verification," each of which is hereby incorporated herein by reference in its entirety together with the reference cited therein.

Figure 4:
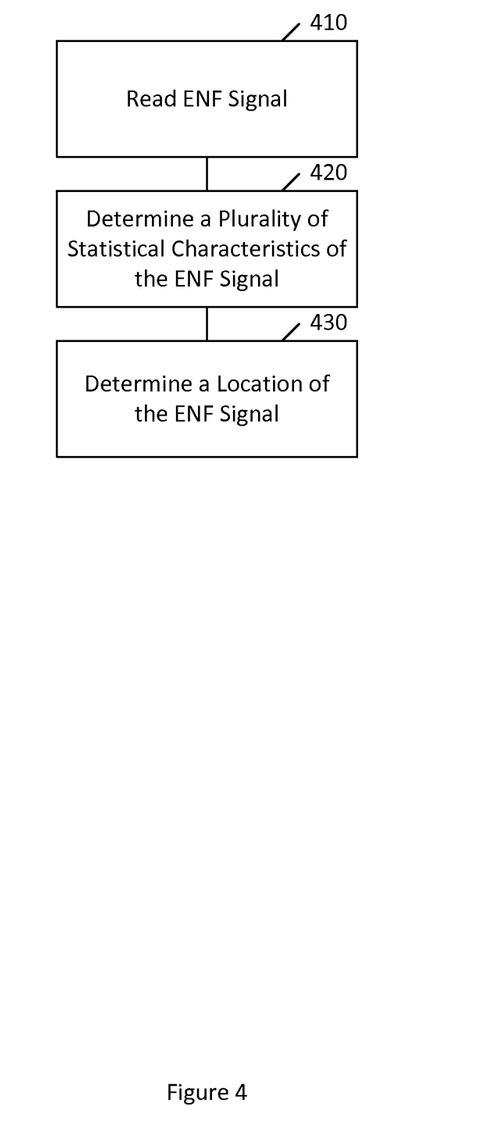
FIG. 4 illustrates a further method according to certain embodiments.

These statistical features can be used without the need for matching against concurrent power electric network frequency signal data. FIG. 4 illustrates a further method according to certain embodiments. The method of FIG. 4 may not require concurrent reference electric network frequency signal data.

The method can include, at 410, reading an electric network frequency signal from a recording. The electric network frequency signal can be read according to any of the methods mentioned herein or by any other suitable method.

The method can also include, at 420, determining a plurality of statistical characteristics of the electric network frequency signal. The statistical characteristics can be applicable to an electric network frequency signal regardless of whether it is obtained from an audio recording, a video recording, or a power recording.

The method can further include, at 430, determining a location of the recording based on the plurality of statistical characteristics. The plurality of statistical characteristics can include at least two of a mean of the electric network frequency signal, a variance of the electric network frequency signal, and a dynamic range of the electric network frequency signal. Likewise, the determining the plurality of statistical characteristics can include applying a transformation to a segment of the electric network frequency signal and examine statistical properties of the transformation. The location determination can be made based on the statistical characteristics as distinct from and without relying on any concurrent recordings.

These statistical characteristics may be as described above, for example with reference to FIG. 3. A system to implement this method may be manually configured or may be trained based on known data. For example, a supervised learning model, such as a support vector machine (SVM) can be used for classification. Weighted SVM can similarly be used, particularly for addressing imbalanced data. It may be beneficial to use data of the same type for training and for classification. For example, if the goal is to classify an electric network frequency from a visual track, it may be best to train the system using visual track electric network frequency data. Similarly, if the goal is to classify an electric network frequency from an audio track, it may be best to train the system using audio track electric network frequency data.

In certain embodiments, other applications of an extracted electric network frequency are possible. For example, an extracted electric network frequency signal can be used to synchronize multimedia. Because the electric network frequency signal can be treated as a continuous-time random process, the realization of the electric network frequency in each recording may serve as a timing fingerprint. Synchronization of audio and video recordings can therefore be performed by matching and aligning their embedded electric network frequency signals.

The electric network frequency based method of synchronization does not need to rely on having common audio and visual contents between the multiple recordings to be synchronized. Taking video synchronization for example, the conventional approaches based on visual cues may not work well in situations where there are arbitrary camera motions or the view overlap is insufficient, while the electric network frequency based method may not be affected by these adverse conditions, or may not be adversely affected in a similar way.

For example, in a first recording electric network frequency may be present at a variety of harmonics, and, for example, most strongly around 360 Hz. In a second related recording, the electric network frequency may be noisier and may be most strongly present around 120 Hz and 360 Hz. The electric network frequency of the first recording can be extracted from around 360 Hz. For the second recording, a spectrum combining technique for electric network frequency estimation can be used to combine the electric network frequency traces from around 120 Hz and 360 Hz to arrive at a more reliable electric network frequency estimate. The resulting electric network frequency signal may still be noisy and may be cleaned by locating outliers and replacing them using linear interpolation from surrounding electric network frequency values. The cleaned electric network frequency signal from the second recording can then be aligned (or checked for alignment with) the electric network frequency signal of the first recording.

Other implementations are also possible. For example, in the case of multiple security cameras in a surveillance situation, the electric network frequency signal can be used to authenticate a common time stamp amongst a plurality of cameras, even when the cameras are located in different rooms. For example, an authentication process can automatically run periodically to compare electric network frequency signals from each of a plurality of video feeds to compare whether they sufficiently align with one another or whether one or more of the video feeds may have been altered. This can be done without imposing any special requirements on the lighting of rooms, where much of the lighting is provided by fluorescent or similar light sources.

Similarly, electric network frequency extracted from multiple streams can be used to align the streams. The streams can be visual or audio tracks or whatever detectable sources of electric network frequency, or their combinations. The applications go beyond just security, and can also synthesize multiple-view multiple-modality streams. For example, streams from a sports competition can be synchronized from multiple angles using normal cameras at hand, without expensive pre-installed equipment. This may particularly valuable in the case of indoor sports that are illuminated by fluorescent lighting, such as racquetball, basketball, or volleyball.

Additionally, such synchronization can be applied when the audio tracks of the various streams each include electric network frequency, such as from power supplies or the like. This use of synchronization can be applied even if the particular audio track has no significant audio overlap with other audio tracks, such as feeds from opposite ends of a race track or football field. Thus, synchronization of the video feeds can be performed based on audio tracks without the need for corresponding audio data on the tracks.

In such synchronizations, a power electric network frequency record can be used as a baseline. If, initially, there is no match between audio electric network frequency and power electric network frequency, outliers can be pinpointed and removed.

In certain cases, it may be easiest to obtain an electric network frequency from a video image of a stationary object. Thus, if a camera angle changes with respect to a view, the system can perform a transformation to treat the image as if it were stationary. Another alternative is to ignore portions of the image that include significantly changing aspects, such as a foreground portion, while considering only the relatively static portions of the image, such as the background portion.

Figure 5:
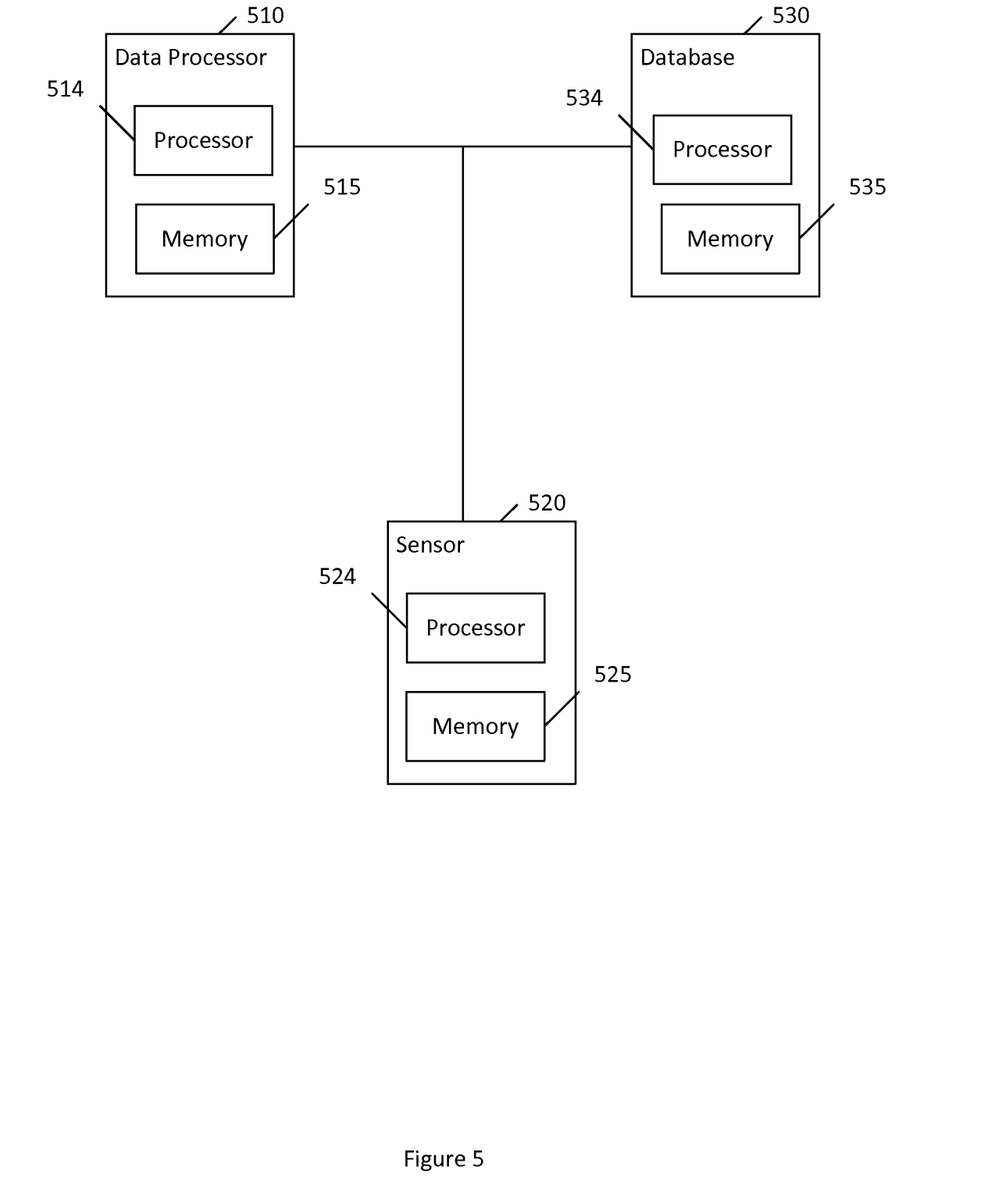
FIG. 5 illustrates a system according to certain embodiments.

The above-described methods can be variously implemented. FIG. 5 illustrates a system according to certain embodiments. As shown in FIG. 5, a system can include at least one data processor 510, at least one FIG. 5 illustrates a system according to certain embodiments of the invention. In one embodiment, a system may include multiple devices, such as, for example, at least one data processor 510, at least one sensor 520, and at least one database 530. In certain systems, data processor 510, sensor 520, database 530, and a plurality of other devices may be present. Other configurations are also possible. The data processor 510 may be equipped for processing, storing, and displaying information relating to electric network frequency signals. The sensor 520 may be equipped to capture an electric network frequency signal either directly or as part of an audio, video, or power recording. The database 530 may be equipped to store electric network frequency signal data, raw records, statistical characteristics of electrical network frequency systems, and the like.

Each of these devices may include at least one processor, respectively indicated as 514, 524, and 534. At least one memory can be provided in each device, as indicated at 515, 525, and 535, respectively. The memory may include computer program instructions or computer code contained therein. The processors 514, 524, and 534 and memories 515, 525, and 535, or a subset thereof, can be configured to provide means corresponding to the various blocks of FIGS. 1, 2, and 4. Although not shown, the devices may also include user interfaces, including displays, touch screens, keyboards, and the like.

Processors 514, 524, and 534 can be embodied by any computational or data processing device, such as a central processing unit (CPU), application specific integrated circuit (ASIC), or comparable device. The processors can be implemented as a single controller, or a plurality of controllers or processors.

Memories 515, 525, and 535 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as data processor 510, sensor 520, and database 530, to perform any of the processes described above (see, for example, FIGS. 1, 2, and 4). Therefore, in certain embodiments, a non-transitory computer-readable medium can be encoded with computer instructions that, when executed in hardware, perform a process such as one of the processes described herein. Alternatively, certain embodiments can be performed entirely in hardware.

Furthermore, although FIG. 5 illustrates a system including a data processor, sensor, and database, embodiments of the invention may be applicable to other configurations, and configurations involving additional elements. The features of the data processor 510, database 530, and sensor 520 are shown connected by a physical bus, but the components can be connected in other ways and do not need to be permanently connected to other components.

Certain technologies may pose particular challenges. For example, forgers may have access to recorded power electric network frequency and may be able to compensate a video or audio track to correspond to the recorded power electric network frequency. Similarly, some camera systems use white balancing to automatically adjust sensitivity to light. These changes in sensitivity may make it difficult to accurately obtain an electric network frequency, unless the white balancing events can be identified and compensated for. Other noise factors can also produce distortion of the electric network frequency, such as pixel value variations due to environmental conditions, such as shadows.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:
1. A method, comprising:
reading data representative of sensed light in a visual track of a video recording; and
extracting an electric network frequency signal from the data representative of sensed light, wherein the extracting the electric network frequency signal comprises performing a row by row analysis of the data representative of sensed light; and applying the extracted electric net- work frequency signal to perform at least one task of authentication of the video recording or data analytics of the video recording.

2. The method of claim 1, wherein the extracting comprises performing an aliasing analysis.

3. The method of claim 2, wherein the extracting additionally comprises supplying the filtered electric network frequency signal to a band-pass filter with a narrow passband.

4. The method of claim 1, further comprising: determining a location of the sensed light based on the extracted electric network frequency signal.

5. The method of claim 1, further comprising: determining whether tampering of the video recording has occurred by comparing the electric network frequency signal to another sample of electric network frequency signal.

6. A method, comprising:
reading data representative of sensed light in a visual track of a video recording;
extracting an electric network frequency signal from the data representative of sensed light synchronizing a plurality of multimedia streams based on the extracted electric network frequency signal; and outputting a time alignment information, location relationship, or both a time alignment and a location relationship of the multimedia streams based on the synchronizing.

7. A method, comprising:
reading an electric network frequency signal; and obtaining a location signature for the electric network frequency signal, wherein the location signature is on a smaller scale than a grid, and wherein the obtaining the location signature comprises passing the electric network frequency signal through one filter or a combination of filters and
subtracting an output of the one filter or the combination of filters from the electric network frequency signal; and applying the obtained location signature to perform at least one task of authentication of the video recording or data analytics of the video recording.

8. The method of claim 7, further comprising: obtaining a location corresponding to the electric network frequency signal by comparing the location signature to at least one other location signature having a known location within a grid.

9. A method, comprising: reading an electric network frequency signal from a recording; determining a plurality of statistical characteristics of the electric network frequency signal; determining a location of the recording based on the plurality of statistical characteristics; and applying the determined location of the recording to perform at least one task of authentication of the video recording or data analytics of the video recording.

10. The method of claim 9, wherein the plurality of statistical characteristics comprise at least two of a mean of the electric network frequency signal, a variance of the electric network frequency signal, and a dynamic range of the electric network frequency signal.

11. The method of claim 9, wherein the determining the plurality of statistical characteristics comprises applying a transformation to a segment of the electric network frequency signal and examine statistical properties of the transformation.

12. An apparatus, comprising: at least one processor; and at least
one memory including computer program code,
wherein the at least one memory and the computer program code are configured to, with the at least one processor, cause the apparatus at least to
read data representative of sensed light in a visual track of a video recording; and
extract an electric network frequency signal from the data representative of sensed light,
wherein the extraction comprises performing a row by row analysis of the data representative of sensed light; and
apply the extracted electric network frequency signal to perform at least one task of authentication of the video recording or data analytics of the video recording.

13. The apparatus of claim 12, wherein the at least one memory and the computer program code are configured to, with the at least one processor, cause the apparatus at least to extract the electric network frequency signal by performing an aliasing analysis.

14. The apparatus of claim 13, wherein the at least one memory and the computer program code are configured to, with the at least one processor, cause the apparatus at least to extract the electric network frequency by supplying the filtered electric network frequency signal to a band-pass filter with a narrow passband.

15. An apparatus, comprising: at least one processor; and at least one memory including computer program code, wherein the at least one memory and the computer program code are configured to, with the at least one processor, cause the apparatus at least to read an electric network frequency signal; and obtain a location signature for the electric network frequency signal by passing the electric network frequency signal through one filter or a combination of filters and subtracting an output of the one filter or the combination of filters from the electric network frequency signal, wherein the location signature is on a smaller scale than a grid; and apply the obtained location signature to perform at least one task of authentication of the video recording or data analytics of the video recording.

16. The apparatus of claim 15, wherein the at least one memory and the computer program code are configured to, with the at least one processor, cause the apparatus at least to obtain a location corresponding to the electric network frequency signal by comparing the location signature to at least one other location signature having a known location within a grid.

17. An apparatus, comprising: at least one processor; and at least one memory including computer program code, wherein the at least one memory and the computer program code are configured to, with the at least one processor, cause the apparatus at least to read an electric network frequency signal from a recording; determine a plurality of statistical characteristics of the electric network frequency signal; and determine a location of the recording based on the plurality of statistical characteristics; and apply the determined location of the recording to perform at least one task of authentication of the video recording or data analytics of the video recording.

18. The apparatus of claim 17, wherein the at least one memory and the computer program code are configured to, with the at least one processor, cause the apparatus at least to determine the plurality of statistical characteristics by applying a transformation to a segment of the electric network frequency signal and examine statistical properties of the transformation.

* * * * *